April 2, 1929.  J. H. HUFFMAN  1,707,396
LAWN MOWER SHARPENER
Filed June 21, 1927  3 Sheets-Sheet 1
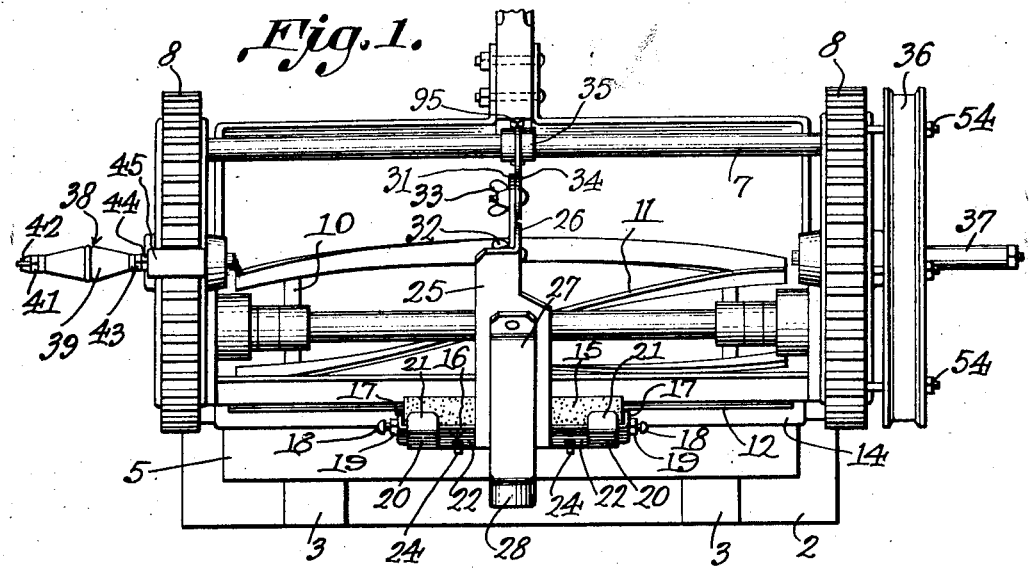
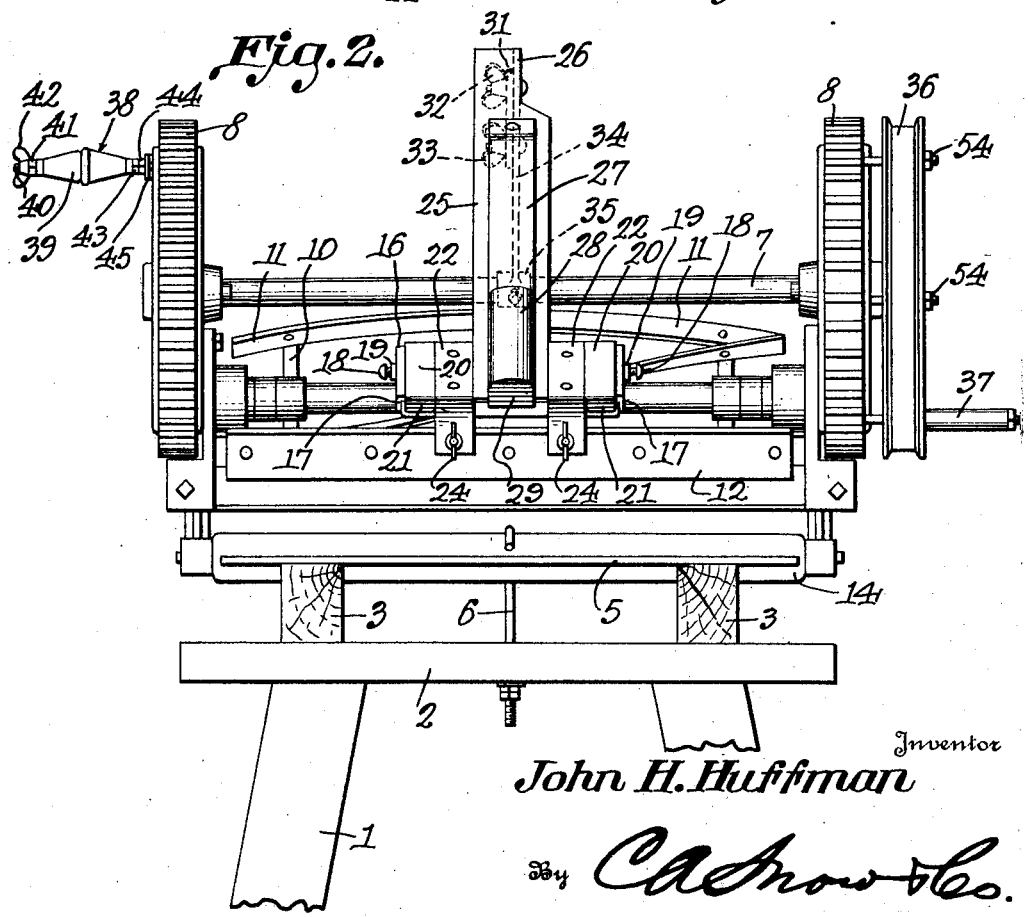
Inventor
John H. Huffman
By C. A. Snow & Co.
Attorneys

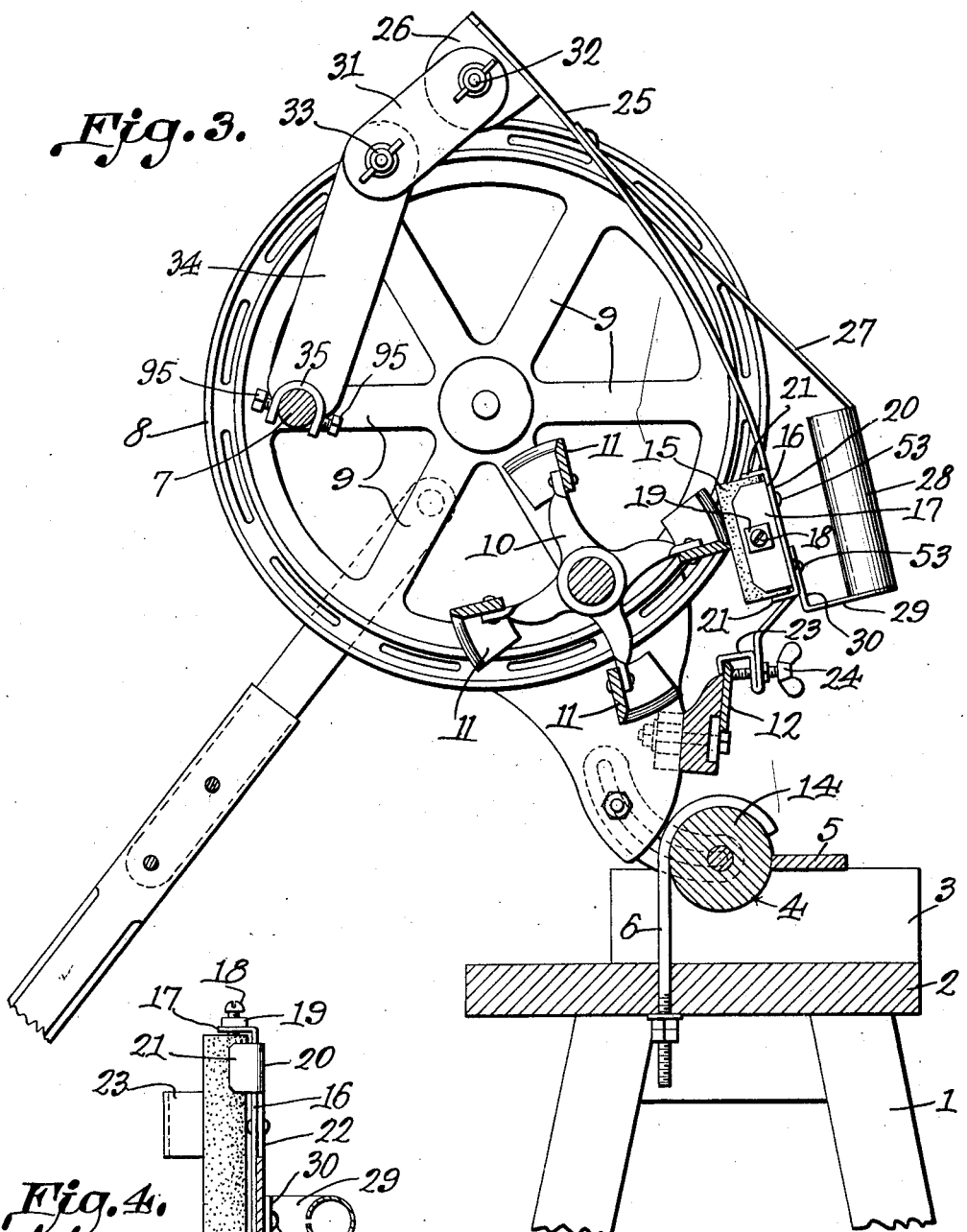
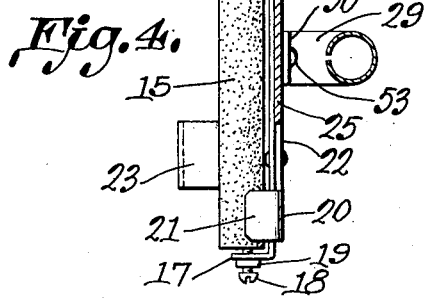

April 2, 1929.  J. H. HUFFMAN  1,707,396
LAWN MOWER SHARPENER
Filed June 21, 1927  3 Sheets-Sheet 3
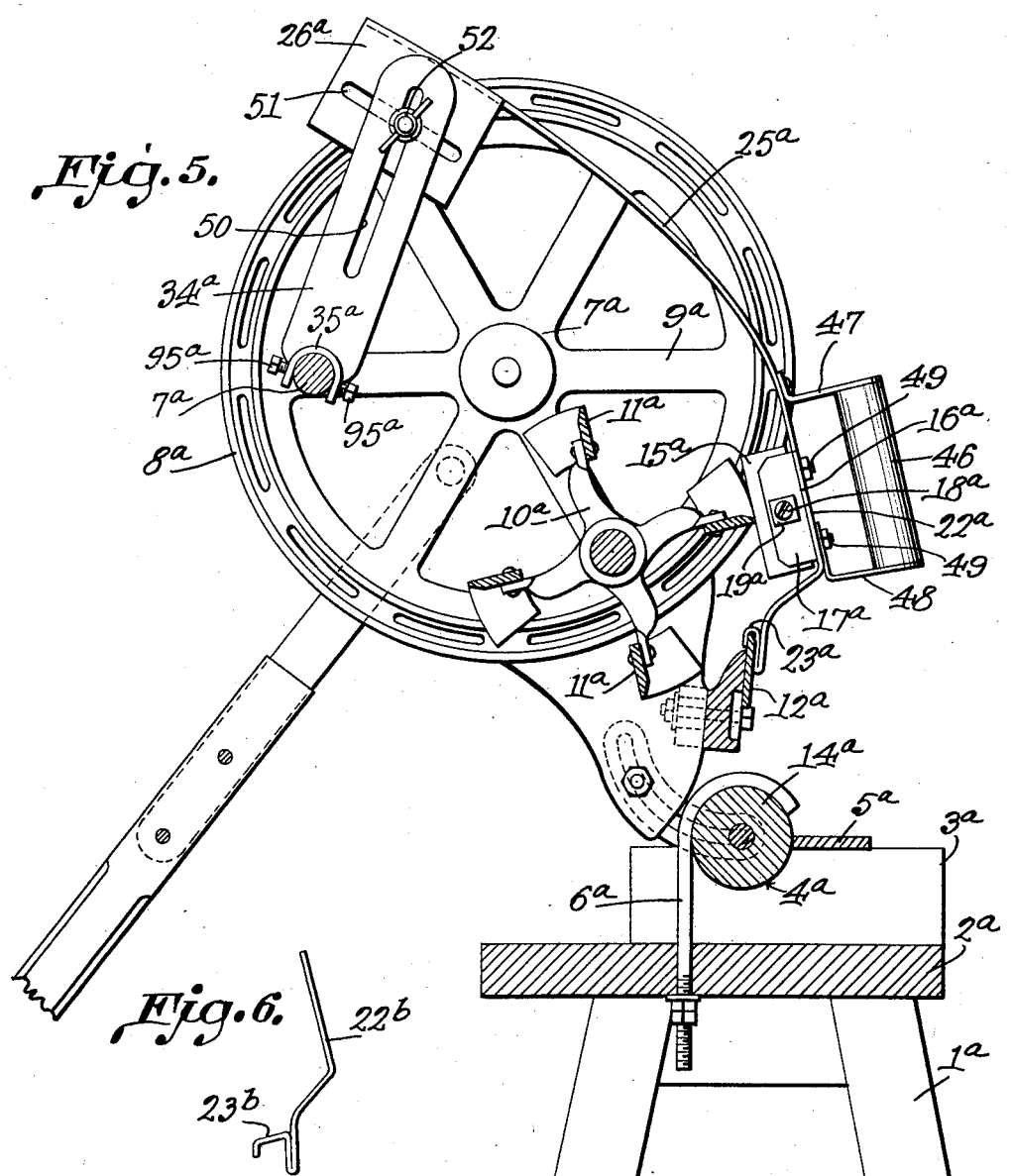
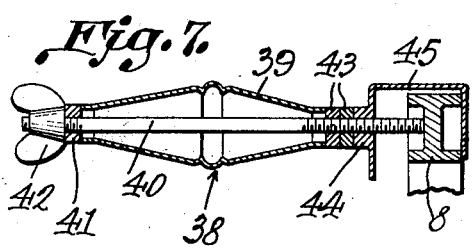

Patented Apr. 2, 1929.

1,707,396

UNITED STATES PATENT OFFICE.

JOHN H. HUFFMAN, OF COVINGTON, TENNESSEE, ASSIGNOR OF ONE-HALF TO CHARLES P. SIMONTON, OF COVINGTON, TENNESSEE.

LAWN-MOWER SHARPENER.

Application filed June 21, 1927. Serial No. 200,418.

This invention aims to provide a novel means whereby the blades of the cutter head of a lawn mower may be sharpened, the cutter head and the blades being turned, and the sharpening element remaining stationary, saving in so far as it is adjusted lengthwise of the blades so that all portions of the blades may be ground.

Another object of the invention is to provide a device of the sort above mentioned, which is simple in construction, the number of movable parts, subject to deterioration, being reduced to a minimum, durability and simplicity of adjustment being promoted.

A further object of the invention is to provide a lawn mower sharpener which will be inexpensive to manufacture, the article, notwithstanding its low price, operating in so satisfactory a way that it will replace expensive lawn mower sharpeners, and do away with sharpening by hand file, and other time-consuming methods of a similar kind.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in top plan, a device constructed in accordance with the invention, assembled with a lawn mower;

Figure 2 is an elevation of the structure shown in Figure 1;

Figure 3 is an enlarged vertical cross section showing the mower, its support, and the sharpening mechanism in place;

Figure 4 is a sectional view disclosing the holder and the sharpening element;

Figure 5 is a view similar to Figure 3, but showing a modification;

Figure 6 is an elevation showing a modified attaching bracket;

Figure 7 is a sectional view illustrating the handle.

The lawn mower which is to be sharpened, may be held in various ways. In the drawings, but not of necessity, there is provided a trestle 1 including a platform 2 carrying sills 3 having seats 4, the sills 3 being connected by a cross piece 5. An anchor 6 is vertically adjustable in the platform 2, and may be a hook bolt overhanging the seats 4.

In the drawings, there is shown a lawn mower, the frame of which embodies a cross rod 7. The rotatable ground wheels are shown at 8, and sometimes have spokes 9. The cutter head 10 is driven from the ground wheels 8 by a gearing, not shown in the drawings, but understood thoroughly by any one skilled in this art. The blades 11 of the cutter head cooperate with the fixed shear bar 12. The roller of the mower is shown at 14.

In preparing the mower for sharpening, the fixed shear bar 12 is shifted a little way from the blades 11 of the cutter head 10, the roller 14 is mounted in the seats 4, and the anchor 6 is engaged with the roller 14 to hold the lawn mower on the trestle 1, in the position shown in the drawings.

The numeral 15 designates a grinding block, of carborundum or other suitable material, whereby the blades 11 are sharpened. The block 15 may be as long as desired and is retained in a holder including a plate 16 having end flanges 17 into which are threaded set screws 18, adapted to engage the ends of the grinding block 15, the set screws being held in place by lock nuts 19 which bear upon the end flanges 17. Straps 20 extend transversely of the plate 16 at the ends of the plate, and are provided with angularly disposed fingers 21 which engage the longitudinal edges of the grinding block 15, to aid in holding the grinding block in place.

Brackets 22 are disposed transversely of the plate 16, and are secured thereto, the brackets being disposed between the straps 20. The brackets 22 are prolonged downwardly and forwardly beneath the grinding block 15 and its holder, as shown in Figure 3 of the drawings, the brackets terminating at their lower ends in U-shaped jaws 23. In the outer wall of each jaw 23, a clamp screw 24 is threaded. The shear bar 12 of the lawn mower is received in the jaw 23, and the shear bar may be clamped between the inner end of the screw 24 and the adjacent wall of the fixed jaw 23, as shown best in Figure 3 of the drawings.

An arm of considerable length extends upwardly from the plate 16, the arm being designated by the numeral 25, and being provided, at its upper end with a rectangularly disposed wing 26. The numeral 27 marks an inclined brace, the upper end of which is connected to the arm 25. The brace 27 has side flanges which are rolled under to form a handle 28, the handle 28 being provided at its rear end with a rectangularly disposed strip 29 terminating in a foot 30 located approximately parallel to the handle 28 and secured by a rivet 53 or the like, to the plate 16, there being two of the rivets 53, and these rivets serving to attach the arm 25 to the plate 16.

The numeral 31 indicates a link which is pivoted by a clamp bolt 32 to the wing 26 on the arm 25, the construction being such that, when the clamp bolt 32 is loosened, the link 31 may be swung for adjustment: whereas, when the clamp bolt 32 is tightened up, the link 31 is held against the wing 26 rigidly. A clamp bolt 33 forms a pivot connection between the link 31 and a standard 34, it being possible to tighten up the clamp bolt 33 and hold the standard 34 at any desired angle with respect to the link 31. At its lower end, the standard 34 has a U-shaped foot 35 which is shaped to fit upon the rod 7 of the lawn mower, or upon any other accessible part of the mower. The foot 35 carries one or more set screws 95 which are used for a purpose which will be described hereinafter.

A pulley 36 is attached by securing elements 54 to one of the ground wheels 8, the pulley 36 having a handle 37. The numeral 38 marks a handle which is disclosed in detail in Figure 7 of the drawings. The handle 38 includes a tubular shell through which extends a rod 40. A nut 41 on the outer end of the rod 40, engages the outer end of the sleeve 39, and a wing nut 42, threaded on the rod 40, engages the nut 41. Cooperating nuts 43 are threaded on the rod 40, and one of the nuts 43 engages the inner end of the tubular shell 39. The outermost one of the nuts 43 is engaged by a nut 44 having a hook-shaped jaw 45 adapted to be engaged around one of the spokes 9 of the ground wheel 8, the inner end of the rod 40 bearing against the said spoke, to hold the spoke clamped against the extremity of the jaw 45, as shown in Figure 7, it being possible to shift the nuts 44, 43, 41 and 42, along the rod 40, so as to enable the inner end of the rod 40 to bear on the spoke 9, and, at the same time, permit the shell 39 to be located properly on the rod 40. If desired, the shell 39 may be permitted to rotate on the rod 40.

If the machine is to be power-driven, a belt (not shown) is placed on the pulley 36. If the machine is not to be power-driven, then it can be operated by the handle 37 or by the handle 38, as the operator may desire. When one of the ground wheels 8 is rotated, the cutter head 10 is turned, and the blades 11 come, one after another, into contact with the grinding block 15, the blades being sharpened in a way which will be understood readily when Figure 3 of the drawings is examined. Ordinarily, the screw 24 is tightened up, so as to hold the block 15 in place rigidly and securely until a definite portion of the blade 11 is sharpened, and, then, the screw 24 is backed off, and the block 15 with the parts which carry it, are shifted over to a new position. Some operators, however, may desire the screw 24 to have a sliding contact with the fixed shear 12, and, then, the device may be slid by means of the handle 28, along the shear bar 12 and along the rod 7, longitudinally of the blades 11, whilst the cutter head 10 is turning. It is preferred, however, to keep the block 15 is a fixed position until a certain part of each blade 11 has been ground or sharpened. It will be observed that by loosening the clamp bolts 33 and 32, the distance between the foot 35 and the jaw 23, in Figure 3, may be changed, to fit mowers of different dimensions. Moreover, when the clamp bolts 33 and 32 are loosened, the link 31 may be permitted to have a radial swinging movement, thereby to bring the block 15 into such a position that it will engage properly with the blades 11 when the cutter head is turned. When the desired adjustment has been obtained, the clamp bolts 32 and 33 are tightened up. In the event that it is desired to hold the block 15 in a fixed position whilst the blade 11 is being sharpened, the screws 95 are advanced to bind upon the rod 7 or some equivalent part of the mower.

In Figure 5 of the drawings, parts hereinbefore described have been designated by numerals previously used, with the suffix "a". The handle 46 has legs 47 and 48, the leg 47 being attached to the arm 25$^a$, and the leg 48 being held in place by one of the bolts 49 that retain the arm 25, the bolts 49 corresponding to the rivets 53 of Figure 3. The standard 34$^a$ has an elongated slot 50, disposed transversely of a slot 51 in the wing 26$^a$ on the arm 25$^a$. Through the slots 51 and 50 is extended a clamp bolt 52. When the bolt 52 is loose, an adjustment may be obtained resembling the one that is secured when the clamp bolts 32 and 33 of Figure 3 are loosened. When the bolt 52 is tightened up, then the parts will be in the position delineated in Figure 5 with the grinding block 15 properly arranged with respect to the blades 11$^a$. In the form shown in Figure 5 of the drawings, the clamp screw 24 of Figure 3 is omitted, and, in order to accommodate shear bars of different sizes and shapes, the brackets may be changed: thus the bracket 22$^b$ of Figure 6 may be substituted for the bracket shown in Figure 5, the bracket 22$^b$ having a wider jaw 23$^b$ than the jaw 23$^a$ of Figure 5.

The general operation of the device shown in Figure 5 of the drawings does not differ from the operation of the structure shown in Figure 3, to any great extent, it being understood that when the ground wheel 8ª is rotated, the usual lawn mower gearing will cause the cutter head 10ª to turn, the blades 11ª of the cutter head being brought into engagement with the grinding block 15ª in a way which will be understood without difficulty when Figure 5 is noted.

The use of the carborundum block 15, or its equivalent, together with the novel means employed for mounting and operating the block, produce uniformity of result in the grinding operation, coupled with a saving of time and labor.

The article is of small dimensions, and light in weight, and a workman catering to a custom trade, may carry the grinder from place to place and do a high grade of work on the job. The sharpening of the lawn mower may be brought about without pulling the lawn mower apart, or changing its adjustments, aside from shifting the shear bar slightly with respect to the blades.

Some operators may prefer, if the machine is to be power-driven, to apply the belt (not shown) directly on the face of one of the drive wheels or ground wheels 8, in which event the pulley 36 would be dispensed with.

The hook-shaped jaw 45—see Figure 7 of the drawings—is adapted to be engaged or clamped on the rim of one of the drive wheels or ground wheels 8 in order that said ground wheel 8 may be rotated, if desired, by hand with the handle 38, so that the cutter head 10 will be turned or rotated, and the blades 11 will come, one after another, into proper contact with the grinding block 15 during the sharpening process.

What is claimed is:—

1. In a device for sharpening lawn mowers, a holder for a grinding element, a depending supporting bracket carried by the holder and provided with means for engaging the shear bar of a lawn mower, an upstanding arm carried by the holder, a standard provided with means for engaging a stationary part of the frame of a lawn mower, a link, and combined clamping and pivot elements joining the link to the arm and to the standard.

2. In a device for sharpening a lawn mower, a holder for a grinding element, a depending supporting bracket carried by the holder and provided with means for engaging the shear bar of a lawn mower, an upstanding arm connected to the holder, a handle forming a reenforcing connection between the holder and the intermediate portion of the arm, a standard provided at one end with means for engaging a stationary part of the frame of a lawn mower, means for connecting the standard to the arm adjustably, and means for supporting a lawn mower in inverted position, whereby the last specified connecting means will be rendered readily accessible at the top of the mower, and whereby the handle will be rendered readily accessible at one side of the mower to permit an adjustment of the holder lengthwise of the cutting blades of the mower, with the shear bar of the mower and said stationary part as supports.

In testimony that I claim the foregoing as my own, I have hereto affixed my signature.

JOHN H. HUFFMAN.